3,282,983
PREPARATION OF NITROALKYL NITRATES

Donald R. Lachowicz and Kenneth L. Kreuz, Fishkill, N.Y., assignors to Texaco Inc., New York, N.Y., a corporation of Delaware
No Drawing. Filed June 24, 1965, Ser. No. 466,846
4 Claims. (Cl. 260—467)

This invention relates to a novel method of preparing nitroalkyl nitrate. More specifically, it relates to a two stage method of converting an alkene into an intermediate nitroalkylperoxy nitrate in a first stage reaction and then converting the formed peroxy nitrate intermediate to the nitroalkyl nitrate in a second stage reaction.

The nitroalkyl nitrate products of the invention are useful as fuel additives to increase power output of petroleum distillates such as gasoline and kerosene. Further, they are useful as intermediates in the preparation of surfactants, fuel and lubricant additives, insecticides, fungicides, pharmaceuticals and polymers. For example, the nitroalkyl nitrate products of the inventive method may be reduced to form their corresponding amino alcohols and the amine alcohols are reacted with ethylene oxide to form a surfactant material.

In the past, the nitroalkyl nitrates were prepared by reacting alkenes with various nitrating agents and generally permitting the reaction mixture to go through thermal or hydrolytic decomposition. Although this decomposition procedure produced nitroalkyl nitrates, they were formed in relatively poor yields and in admixture with many other products, and therefore, were difficult to isolate in a purified state.

We have found and this constitutes our invention a method whereby nitroalkyl nitrates can be produced in relatively high yields and in relatively pure state without the necessity of utilizing complicated and expensive purification procedures. More particularly, our invention comprises a two stage method as follows:

STAGE I

In the first stage an alkene of at least 4 carbons and up to 55 carbons and higher of the formula:

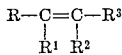

where the R, $R^1$, $R^2$ and $R^3$ groups are hydrogen or alkyl (saturated aliphatic monovalent hydrocarbon) and at least one of said R and $R^1$ groups is alkyl, is contacted simultaneously with dinitrogen tetroxide and oxygen in a mole ratio of alkene to dinitrogen tetroxide to oxygen of between about 1:0.5:1 and 1:1.5:30 at a temperature between about −40 and 20° C. to form a nitroalkylperoxy nitrate having at least 4 carbons of the formula:

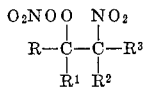

where R, $R^1$, $R^2$ and $R^3$ are as heretofore defined. In the reaction the particular olefinic carbon to which the nitro and nitrate groups respectively attach is a random choice of the reaction when at least one of said R and $R^1$ groups and at least one of said $R^2$ and $R^3$ groups are alkyl with the limitation that the nitro and peroxy nitrate groups do not form on the same carbon. Thus under these conditions product mixtures are produced. However, when $R^2$ and $R^3$ are hydrogen, the nitro group always forms on the terminal olefinic carbon with the peroxy nitrate group on the olefinic carbon adjacent thereto.

Under preferred conditions oxygen and dinitrogen tetroxide are respectively introduced into the reaction system at a rate of between about 5 and 18 mls./min./gram olefins and between about 0.002 and .02 gram./min./gram of alkene.

If desired, the formed nitroalkylperoxy nitrate intermediate is normally purified by stripping off of volatiles under reduced pressure or if of a high enough molecular weight, isolated as an insoluble material, e.g., by filtration.

Under advantageous conditions, the reaction is conducted in the presence of inert diluent in order to facilitate contact between the alkene, dinitrogen tetroxide and oxygen. Examples of the inert diluent contemplated herein are those inert liquid diluents having a boiling point of between about 30 and 100° C. such as n-hexane, heptane and carbon tetrachloride.

The reaction time in the first stage is normally the time it takes to pass the desired amount of dinitrogen tetroxide into the olefinic solution.

It is to be noted that the dinitrogen tetroxide employed is actually an equilibrium mixture of dinitrogen tetroxide and nitrogen dioxide with the equilibrium being driven to essentially 100% dinitrogen tetroxide at 0° C. and essentially 100% nitrogen dioxide at 140° C. at one atmosphere pressure.

Specific examples of the alkene reactants contemplated herein are isobutylene, 1-hexene, 4-nonene, 1-dodecene, 7-pentadecene, 1-octadecene, 3-eicosene and 1-docosene.

The oxygen employed may be in the form of pure oxygen or as a mixture, e.g., air or in admixture with inert gases such as nitrogen.

Specific examples of the formed and recovered nitroperoxyalkyl nitrate intermediates are 1-nitro-2-hexylperoxy nitrate, a mixture of 4-nitro-5-nonylperoxy nitrate and 5-nitro-4-nonylperoxy nitrate, 1-nitro-2-dodecylperoxy nitrate, mixture of 7-nitro-8-pentadecylperoxy nitrate and 8-nitro-7-pentadecylperoxy nitrate, 1-nitro-2-octadecylperoxy nitrate, a mixture of 3-nitro-eicosylperoxy nitrate and 4-nitro-3-eicosylperoxy nitrate and 1-nitro-2-docosylperoxy nitrate.

SECOND STAGE

The recovered nitroalkylperoxy nitrate from the first stage is then contacted with a reducing agent at a temperature of between about −20 and 30° C. in a mole ratio of nitroperoxyalkyl nitrate to reducing agent of between about 1:1 and 5:1 to form the nitroalkyl nitrate product of the formula:

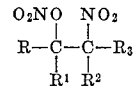

where R, $R^1$, $R^2$ and $R^3$ are as heretofore defined and at least one of said $R^1$ and $R^2$ groups is alkyl. The reaction is normally conducted for the length of time required to add the reducing agent. The resultant nitroalkyl nitrate can be recovered by standard means such as via fraction distillation under reduced pressure, column chromatography, and selective removal of impurities by solid absorbants.

Under preferred conditions, inert diluent is employed to facilitate contact of the reducing agent with the peroxy nitrate. Examples of this inert liquid diluent are those inert liquid diluents having a boiling point between about 30 and 100° C. such as carbon tetrachloride, n-hexane and diethylether.

Specific examples of the reducing agents contemplated herein are nitric oxide; trialkylphosphite of 3 to 6 carbons such as trimethylphosphite, triethylphosphite; sulfur dioxides; alkali metal sulfite, bisulfites and thiosulfates such as sodium sulfite, potassium sulfite, sodium bisulfite and potassium thiosulfate, aqueous solutions of ferrous salts such as aqueous solutions of ferrous chloride and ferrous sulfate.

Specific examples of the nitroalkyl nitrates contemplated herein are 1-nitro-2-hexyl nitrate, mixture of 4-nitro-5-nonyl nitrate and 5-nitro-4-nonyl nitrate, 1-nitro-2-dodecyl nitrate, mixture of 7-nitro-8-pentadecyl nitrate and 8-nitro-7-pentadecyl nitrate, 1-nitro-2-octadecyl nitrate, mixture of 3-nitro-4-eicosyl nitrate and 4-nitro-3-eicosyl nitrate and 1-nitro-2-docosyl nitrate.

The method of the invention is further explained by the following equations utilizing nitric oxide as the reducing agent:

(I) 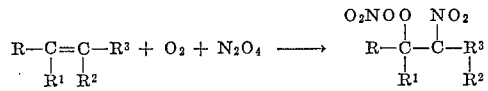

(II) 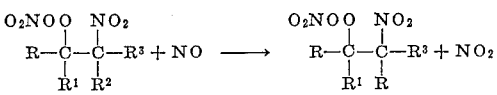

where R, $R^1$ $R^2$ and $R^3$ are as heretofore defined and at least one of said R and $R^1$ groups is alkyl.

The following examples further illustrate the invention but are not to be taken as limitations thereof.

*Example I*

This example illustrates the first stage of the method, namely, the preparation of a nitroalkylperoxy nitrate from an olefin.

To 7.4 grams (11.0 mls.) of 1-hexene in admixture with 60 mls. of carbon tetrachloride as inert diluent there was added simultaneously oxygen at a rate of 56.5 mls./min. and dinitrogen tetroxide at a rate of 0.02 gram/min. for a period of about 7 hours at 0° C. The product was identified by infrared and nuclear magnetic spectroscopy as 1-nitro-2-hexylperoxy nitrate.

*Example II*

This example illustrates the conversion of the nitroalkylperoxy nitrate product of Example I to the corresponding nitroalkyl nitrate.

To a solution of 19.8 grams (0.095 mole) of the 1-nitro-2-hexylperoxy nitrate containing reaction mixture prepared in Example I and 60 mls. of carbon tetrachloride, there was added by bubbling therethrough nitric oxide at a rate of 56.5 mls./min. for a period of 50 minutes while maintaining the reaction mixture at 0° C. At the end of the 50 minute reaction period the final reaction mixture was subjected to quantitative infrared spectroscopic analysis showing 1-nitro-2-hexyl nitrate was formed in a yield of approximately 75 mole percent.

*Example III*

This example further illustrates the method of the invention.

To 4.7 mls. of isobutylene in carbon tetrachloride there was added over about a 4 hour period a mixture of oxygen at a rate of 56.5 mls./min. and 3.75 grams dinitrogen tetroxide at between —10 and 0° C. At the end of the addition period the volatile materials were stripped out leaving a 1-nitro-t-butylperoxy nitrate containing residue, the peroxy nitrate being characterized by infrared and nuclear magnetic resonance spectroscopic analysis. Through said reside in carbon tetrachloride solution there was successively bubbled nitrogen for a 10 minute period, followed by nitric oxide at a rate of 60 mls./min. for a period of 25 minutes at about 0° C. The resultant product was purified by column chromatography and was identified by nuclear magnetic resonance, infrared and refractive index analyses as 1-nitro-t-butyl nitrate. The overall yield of nitrate product determined by quantitative infrared spectroscopic analysis was 67 mole percent.

We claim:
1. A method of preparing a nitroalkyl nitrate having at least 4 carbons of the formula:

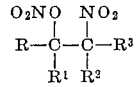

where R, $R^1$, $R^2$ and $R^3$ groups are hydrogen or alkyl and where at least one of said R and $R^1$ members is alkyl, comprising:

(1) simultaneously contacting an alkene of the formula:

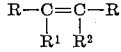

having at least 4 carbons, where R, $R^1$, $R^2$ and $R^3$ are as heretofore defined, with oxygen and dinitrogen tetroxide at a temperature between about —40 and 20° C. in a mole ratio of said alkene to said dinitrogen tetroxide to said oxygen of between about 1:0.5:1 and 1:1.5:30 to form nitroalkylperoxy nitrate of the formula:

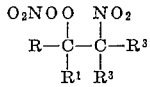

where R, $R^1$, $R^2$ and $R^3$ are as heretofore defined, (2) contacting said nitroalkylperoxy nitrate with a reducing agent at a temperature between about —20 and 30° C. utilizing a mole ratio of said nitroalkylperoxy nitrate to said reducing agent of between about 1:1 and 5:1 to form said nitroalkyl nitrate.

2. A method in accordance with claim 1 wherein said first and second contactings are conducted in the presence of inert liquid diluent and said reducing agent is trialkylphosphite of 3 to 6 carbons, nitric oxide, alkali metal sulfite, alkali metal bisulfite, aqueous solutions of ferrous salts and sulfur dioxide.

3. A method in accordance with claim 2 wherein said alkene is 1-hexene, said nitroalkylperoxy nitrate is 1-nitro-2-hexylperoxy nitrate, said reducing agent is nitric oxide, said inert liquid diluent is carbon tetrachloride and said nitroalkyl nitrate is 1-nitro-2-hexyl nitrate.

4. A method in accordance with claim 2 wherein said alkene is isobutylene, said nitroalkylperoxy nitrate is 1-nitro-t-butylperoxy nitrate, said reducing agent is nitric oxide, said inert liquid diluent is carbon tetrachloride, and said nitroalkyl nitrate is 1-nitro-t-butyl nitrate.

References Cited by the Examiner
UNITED STATES PATENTS
3,189,654   6/1965   Arthur _____ 260—466 X References Cited by the Applicant
H. Shechter: Record of Chemical Progress, 25, 55 (1964).
T. E. Stevens: J. Org. Chem., 25 1658 (1960).
N. Baryshnikova et al., Chem. Abstr., 48, 10629 (1954).

BENJAMIN R. PADGETT, *Primary Examiner.*

L. A. SEBASTIAN, *Assistant Examiner.*